United States Patent
Chatterjee et al.

(10) Patent No.: US 8,200,945 B2
(45) Date of Patent: Jun. 12, 2012

(54) VECTOR UNIT IN A PROCESSOR ENABLED TO REPLICATE DATA ON A FIRST PORTION OF A DATA BUS TO PRIMARY AND SECONDARY REGISTERS

(75) Inventors: Siddhartha Chatterjee, Yorktown Heights, NY (US); Kenneth Dockser, Cary, NC (US); Fred Gehrung Gustayson, Briarcliff Manor, NY (US); Manish Gupta, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2393 days.

(21) Appl. No.: 10/704,214

(22) Filed: Nov. 7, 2003

(65) Prior Publication Data

US 2005/0102487 A1 May 12, 2005

(51) Int. Cl.
*G06F 9/30* (2006.01)
(52) U.S. Cl. .................................................. 712/218
(58) Field of Classification Search ................... 712/218
See application file for complete search history.

(56) References Cited

U.S. PATENT DOCUMENTS

| | | | |
|---|---|---|---|
| 4,884,190 A | 11/1989 | Ngai et al. | |
| 5,799,163 A | 8/1998 | Park et al. | |
| 5,832,290 A | 11/1998 | Gostin et al. | |
| 5,887,183 A * | 3/1999 | Agarwal et al. | 712/2 |
| 5,991,531 A | 11/1999 | Song et al. | |
| 6,058,465 A | 5/2000 | Nguyen | |
| 2002/0138657 A1* | 9/2002 | Hirofuji | 709/253 |
| 2003/0018676 A1* | 1/2003 | Shaw | 708/501 |

OTHER PUBLICATIONS

Computer Organization and Design by Patterson and Hennessy.*

* cited by examiner

*Primary Examiner* — Robert Fennema
(74) *Attorney, Agent, or Firm* — Yudell Isidore Ng Russell PLLC

(57) ABSTRACT

A microprocessor includes a branch unit, a load/store unit (LSU), an arithmetic logic unit (ALU), and a vector unit to execute a vector instruction. The vector unit includes a vector register file having a primary vector register and a secondary vector register. The processor preferably further includes a first data bus and a second data bus wherein the first and second data busses couple the vector unit to the data memory. The vector unit includes a first input multiplexer enabling data on the first data bus to be provided to the primary register file or the secondary register file and a second input multiplexer, independent of the first input multiplexer enabling data on the second data bus to be provided to the second data bus. The first and second data busses may comprise first and second portions of a data memory bus.

14 Claims, 3 Drawing Sheets

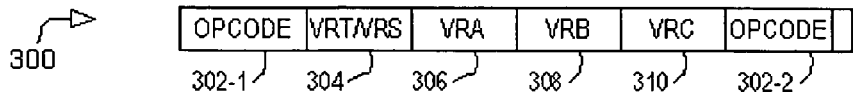

FIG 3

| | |
|---|---|
| PARALLEL ADD/SUBTRACT | $A_P+B_P \rightarrow T_P, A_S+B_S \rightarrow T_S$ |
| MULTIPLY | |
|   PARALLEL | $A_P C_P \rightarrow T_P, A_S C_S \rightarrow T_S$    410 |
|   CROSS | $A_S C_P \rightarrow T_P, A_P C_S \rightarrow T_S$    411 |
|   CROSS COPY PRIMARY | $A_P C_P \rightarrow T_P, A_P C_S \rightarrow T_S$ |
|   CROSS COPY SECONDARY | $A_S C_P \rightarrow T_P, A_S C_S \rightarrow T_S$ |
| MULTIPLY AND ADD/SUBSTRACT |    414 |
|   PARALLEL | $A_P C_P+B_P \rightarrow T_P, A_S C_S+B_S \rightarrow T_S$ — 403 |
|   PARALLEL NEGATE | $-(A_P C_P+B_P) \rightarrow T_P, -(A_S C_S+B_S) \rightarrow T_S$ |
|   PARALLEL SUBTRACT | $A_P C_P-B_P \rightarrow T_P, A_S C_S-B_S \rightarrow T_S$    409 |
|   PARALLEL NEGATE SUBTRACT | $-(A_P C_P-B_P) \rightarrow T_P, -(A_S C_S-B_S) \rightarrow T_S$ |
|   CROSS | $A_S C_P+B_P \rightarrow T_P, A_P C_S+B_S \rightarrow T_S$ — 405 |
|   CROSS NEGATE | $-(A_S C_P+B_P) \rightarrow T_P, -(A_P C_S+B_S) \rightarrow T_S$ |
|   CROSS SUBTRACT | $A_S C_P-B_P \rightarrow T_P, A_P C_S-B_S \rightarrow T_S$ |
|   CROSS NEGATE SUBTRACT | $-(A_S C_P-B_P) \rightarrow T_P, -(A_P C_S-B_S) \rightarrow T_S$ |
|   CROSS REPLICATE PRIMARY | $A_P C_P+B_P \rightarrow T_P, A_P C_S+B_S \rightarrow T_S$ — 406 |
|   CROSS REPLICATE PRIMARY NEGATE | $-(A_P C_P+B_P) \rightarrow T_P, -(A_P C_S+B_S) \rightarrow T_S$ |
|   CROSS REPLICATE PRIMARY SUBTRACT | $A_P C_P-B_P \rightarrow T_P, A_P C_S-B_S \rightarrow T_S$ |
|   CROSS REPLICATE PRIMARY NEGATE SUBTRACT | $-(A_P C_P-B_P) \rightarrow T_P, -(A_P C_S-B_S) \rightarrow T_S$ |
|   CROSS REPLICATE SECONDARY | $A_S C_P+B_P \rightarrow T_P, A_S C_S+B_S \rightarrow T_S$ |
|   CROSS REPLICATE SECONDARY NEGATE | $-(A_S C_P+B_P) \rightarrow T_P, -(A_S C_S+B_S) \rightarrow T_S$ |
|   CROSS REPLICATE SECONDARY SUBTRACT | $A_S C_P-B_P \rightarrow T_P, A_S C_S-B_S \rightarrow T_S$ |
|   CROSS REPLICATE SECONDARY NEGATE SUB | $-(A_S C_P-B_P) \rightarrow T_P, -(A_S C_S-B_S) \rightarrow T_S$ |
| ASYMMETRIC MULTIPLY AND ADD/SUB | |
|   CROSS COPY PRIMARY SUB PRIMARY | $-(A_P C_P-B_P) \rightarrow T_P, A_P C_S+B_S \rightarrow T_S$ — 407 |
|   CROSS COPY SECONDARY SUB PRIMARY | $-(A_S C_P-B_P) \rightarrow T_P, A_S C_S+B_S \rightarrow T_S$ |
|   CROSS COPY PRIMARY SUB SECONDARY | $A_P C_P+B_P \rightarrow T_P, -(A_P C_S-B_S) \rightarrow T_S$ |
|   CROSS COPY SECONDARY SUB SECONDARY | $A_S C_P+B_P \rightarrow T_P, -(A_S C_S-B_S) \rightarrow T_S$ |
| COMPLEX MULTIPLY AND ADD/SUBSTRACT | |
|   CROSS COMPLEX SUB PRIMARY MULT ADD | $-(A_S C_S-B_P) \rightarrow T_P, A_P C_P+B_S \rightarrow T_S$ — 408 |
|   CROSS COMPLEX SUB SECONDARY MULT ADD | $A_S C_S+B_P \rightarrow T_P, -(A_S C_P-B_S) \rightarrow T_S$ |
|   CROSS COMPLEX MULT ADD | $A_S C_S+B_P \rightarrow T_P, A_S C_P+B_S \rightarrow T_S$ |
|   CROSS COMPLEX NEGATIVE MULT SUBTRACT | $-(A_S C_S-B_P) \rightarrow T_P, -(A_S C_P-B_S) \rightarrow T_S$ |
| MOVE, LOAD, STORE | |
|   CROSS MOVE | $B_P \rightarrow T_S, B_S \rightarrow T_P$ |
|   LOAD DOUBLE WORD | $DW[EA] \rightarrow T_P, DW[EA+8] \rightarrow T_S$ |
|   LOAD DOUBLE WORD CROSS | $DW[EA+8] \rightarrow T_P, DW[EA] \rightarrow T_S$    402 |
|   LOAD DOUBLE WORD REPLICATE | $DW[EA] \rightarrow T_P, T_S$ |
|   STORE DOUBLE WORD | $S_P \rightarrow DW[EA], S_S \rightarrow DW[EA+8]$ |
|   STORE DOUBLE WORD CROSS | $S_P \rightarrow DW[EA+8], S_S \rightarrow DW[EA]$ |
|   STORE DOUBLE WORD REPLICATE | $S_P, S_S \rightarrow DW[EA]$ |

FIG 4

VECTOR UNIT IN A PROCESSOR ENABLED TO REPLICATE DATA ON A FIRST PORTION OF A DATA BUS TO PRIMARY AND SECONDARY REGISTERS

BACKGROUND

1. Field of the Present Invention

The present invention is in the field of microprocessors and more particularly in the field of microprocessors with single instruction, multiple data (SIMD) capability.

2. History of Related Art

Single instruction stream multiple data streams (SIMD) computers and vector processors are both useful in computationally intensive applications such as signal processing. In a SIMD computer, two or more processors (or functional units within a processor) execute the same instruction on different data streams. A vector processor is a processor that can operate on an entire vector with one instruction. Historicaly SIMD computers and vector processors have been limited to "strictly parallel" execution modes. For purposes of this disclosure, strictly parallel execution refers to performing the same operation on each of the different data streams (in the case of SIMD) or on each of the elements in a vector (in the case of a vector processor).

Many computationally intensive applications, however, require the performance of related but different operations, in parallel, on related data structures. Complex math is an example of such an application. In complex math, each variable includes a real element and an imaginary element. Due in large to the sign inversion that occurs when a pair of imaginary components are multiplied, complex math computations require different operations on different parts of the variables. Complex math is but one example of an application that is somewhat constrained by the strictly parallel organization of conventional SIMD machines and vector processors. It would be desirable to implement a processor enabling vector-type processing on related data structures while permitting variations in the operations that are performed on the data structures. It would still further facilitate applications such as complex math if the vector type processing enabled flexible ordering and/or replicating of vector data elements as vector data is retrieved from or stored to data memory.

SUMMARY OF THE INVENTION

A microprocessor includes a branch unit, a load/store unit (LSU), an arithmetic logic unit (ALU), and a vector unit to execute a vector instruction. The vector unit includes a vector register file having a primary vector register and a secondary vector register. The processor preferably further includes a first data bus and a second data bus wherein the first and second data busses couple the vector unit to the data memory. The vector unit includes a first input multiplexer enabling data on the first data bus to be provided to the primary register file or the secondary register file and a second input multiplexer, independent of the first input multiplexer enabling data on the second data bus to be provided to the second data bus. The first and second data busses may comprise first and second portions of a data memory bus.

The processor may be configured to access vector data in the data memory such that a first vector element of the vector data travels via the first data bus and a second vector element of the vector data travels via the second data bus. The microprocessor may further include a first output multiplexer enabling data from either the primary register file or the secondary register file to be provided to first portion of the data memory bus and a second output multiplexer, independent of the first output multiplexer, enabling data from either the primary or the secondary register file to be provided to the second portion of the data bus. The first vector element may represent a real portion of a complex number while the second vector element may represent an imaginary portion of a complex number. The state of select signals for the first and second input multiplexers are determined by an opcode of a vector instruction being executed. In one embodiment, the vector unit comprises a floating point vector unit where data is stored in the primary and secondary register files as 64-bit floating point data.

In this manner, the invention provides a microprocessor vector unit including a vector register file having a primary vector register and secondary vector register wherein the vector unit is suitable for achieving data replication and reordering during memory accesses instructions by providing data from a first portion of a data memory bus to either the primary or secondary register file and by providing data from a second portion of the data memory bus to either the primary or secondary register file during a vector load from the data memory. Similarly, the microprocessor is configured to provide data from either the primary or secondary register file to a first portion of a data memory bus and data from either the primary or secondary register file to a second portion of the data memory bus during a vector store to the data memory. The vector unit is thus enabled to reorder or replicate vector elements of vector data as the data is retrieved from or stored to a data memory and to interpret the opcode of a memory access instruction to control the reordering or replication of the vector elements.

BRIEF DESCRIPTION OF THE DRAWINGS

Other objects and advantages of the invention will become apparent upon reading the following detailed description and upon reference to the accompanying drawings in which:

FIG. 3 is a conceptual illustration of an instruction format for use in the processor of FIG. 1 and vector unit of FIG. 2; and FIG. 4 is a listing of exemplary instructions supported by the processor of FIG. 1 using the vector unit of FIG. 2.

Figure 1:
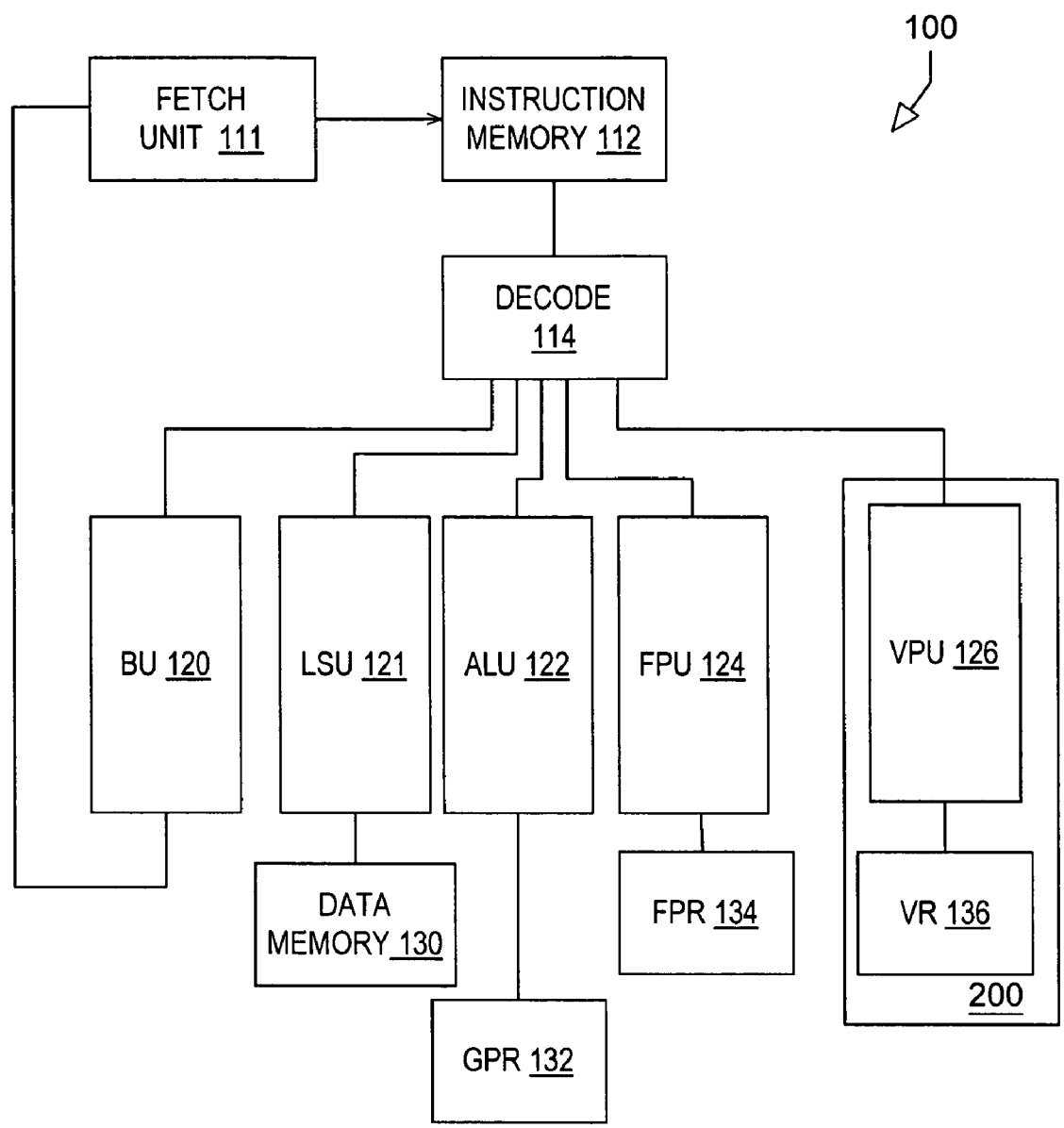
FIG. 1 is a block diagram of selected elements of a processor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a data processing device and system that supports one or more "asymmetric" instructions. Asymmetric instructions, as used herein, are instructions that produce parallel, but different, processing of related data elements.

Referring now to the drawings, FIG. 1 illustrates selected elements of a processing device (processor) 100 according an embodiment of the present invention emphasizing the use of a vector unit 200 to achieve asymmetric SIMD functionality.

In the depicted embodiment, processor 100 is shown as including a fetch unit 111 that provides a next instruction address 113 to an instruction memory 112. Instruction memory 112 responds to the next instruction address signal 113 by providing processor-executable instructions to a decode unit 114. Decode unit 114 is responsible for evaluating the operation codes (opcodes) of the received instructions and for fetching operands from the appropriate register files (connections between decode unit 114 and register files 132, 134, and 136 are not shown in FIG. 1 to improve the clarity of the drawing).

The depicted embodiment of processor 100 includes a number of functional or execution units. These units include a branch unit (BU) 120, a load/store unit (LSU) 121, an arithmetic logic unit (ALU) 122, a floating-point unit (FPU) 124, and a vector unit 200. In addition, processor 100 includes a data memory 130 accessible to LSU 121, a general purpose register (GPR) file 132 accessible to ALU 122, and a floating-point register (FPR) file 134 accessible to FPU 124.

Branch unit 120 evaluates the results of branch instructions to provide fetch unit 111 with a next instruction address when a branch is taken. LSU 121 is configured to retrieve data from and store data to data memory 130. Processor 100 is a load-store processor in which access to data is restricted to a class of load/store instructions. All arithmetic instructions operate on data in the various register files. ALU 122 is an arithmetic unit for performing operations on scalar, integer data. FPU 124 is used to perform scalar floating-point instructions on data stored in FPR file 134. Execution units 120 through 124 will be familiar to those skilled in the design of general purpose microprocessors.

In addition to the conventional execution units 120 through 124, processor 100 according to one embodiment of the invention includes vector unit 200. Vector unit 200 is configured to support the execution of a single vector-type instruction that produces a first operation on a first set of data elements and a second operation on a second set of data elements where the first and second operations are different. Thus, vector unit 200 supports asymmetric vector instructions. Moreover, although the following description is presented in the context of a vector unit 200 that includes a vector register file, the invention encompasses, with appropriate modifications, scalar register file implementations.

Figure 2:
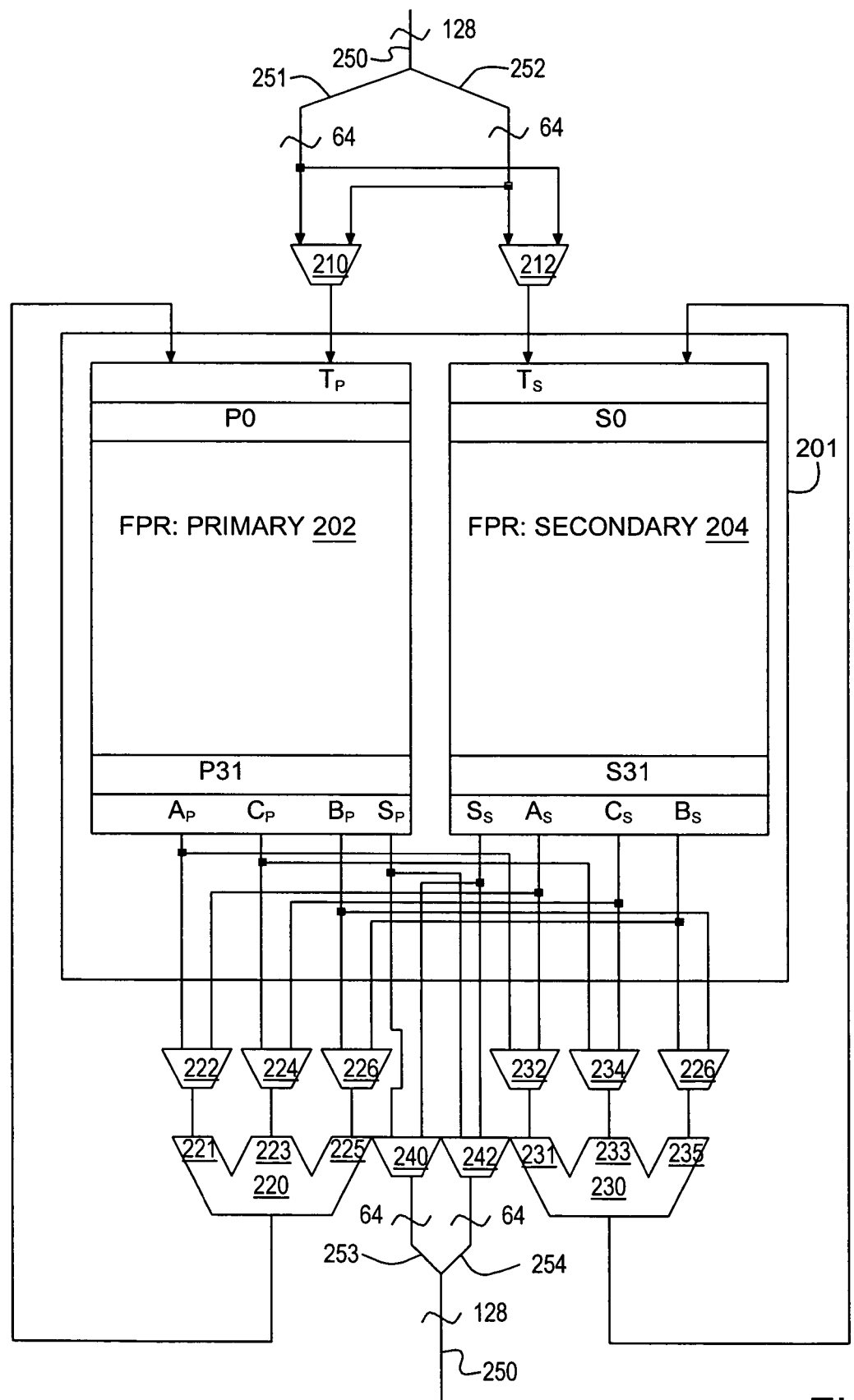
FIG. 2 illustrates selected element of a vector unit suitable for use in the processor of FIG. 1.

Turning now to FIG. 2, selected elements of vector unit 200 of FIG. 1 are depicted to emphasize the unit's flexibility. In the depicted embodiment, a vector register file 201 is implemented with a primary FPR 202 and a secondary FPR 204. Thus, the depicted implementation of vector register file 201 has a "rank" of two. Other implementations may employ a vector register file with more than two register elements per entry. Operation of vector unit 200 will be illustrated using a floating-point, complex arithmetic application. In this context, each of registers in primary and secondary registers 202 and 204 are preferably floating-point registers of 64 bits in width to accommodate double precision floating-point calculations.

Data is retrieved from and stored back to a data memory (not shown in FIG. 2) via a data bus 250. The depicted implementation of data bus 250 is a 128-bit data bus capable of carrying two 64-bit doublewords. The data memory to which vector unit 200 is connected may be the data memory 130 of FIG. 1 or it may be a dedicated vector data memory that is not depicted. In the context of a complex arithmetic application, 128-bit data bus 250 may carry, at any given time, a 64-bit floating-point representation of a real portion of a complex number and a 64-bit floating-point representation of an imaginary portion of a complex number. In such a case, data arriving via data bus 250 may be stored such that the 64-bit real portion of the complex number is stored in one of the 32 registers (P0 through P31) of primary register file 202 while the 64-bit imaginary portion of the complex number is stored in the corresponding register (S0 through S31) of secondary register file 204. If the real portion of a complex number is stored in register P0 of primary register file 202, the imaginary portion of the number is stored in register S0 of secondary register file 204.

An important feature of vector unit 200 is emphasized by the multiplexers 210 and 212 at the input to vector register file 201. These multiplexers, in conjunction with a set of supported instructions, enable reordering (swapping) and/or replication of data arriving via bus 250 as it is stored into register file 201. Similarly, the multiplexers 240 and 242 at the output of vector register file 201 enable reordering or replicating of data as it is stored back to the memory via bus 250.

Generally, one aspect of the invention provides a microprocessor vector unit including a vector register file having a primary vector register and a secondary vector register as described above. The vector unit is suitable for achieving data replication and reordering during memory accesses instructions by providing data from a first portion of a data memory bus to either the primary or secondary register file and by providing data from a second portion of the data memory bus to either the primary or secondary register file during a vector load from the data memory. Similarly, the microprocessor is configured to provide data from either the primary or secondary register file to a first portion of a data memory bus and data from either the primary or secondary register file to a second portion of the data memory bus during a vector store to the data memory. The vector unit is thus enabled to reorder or replicate vector elements of vector data as the data is retrieved from or stored to a data memory and to interpret the opcode of a memory access instruction to control the reordering or replication of the vector elements.

As it is implemented in FIG. 2, for example, the 128-bit bus 250 divides into a pair of 64-bit bit data busses 251 and 252 at the input to vector register file 201. The output of vector register file input multiplexer 210 provides an input to primary register file 202 for storing a first vector element of vector data while the output of multiplexer 212 provides an input to secondary register file 204 for storing a second vector element of vector data. Multiplexers 210 and 212 both receive the first and second 64-bit busses 251 and 252 as inputs. The select signals (not depicted explicitly) of each multiplexer are controlled by the opcode of a vector load or store instruction and determine which of the two busses (251 or 252) will provide the input to the corresponding register file (202 or 204).

In the depicted implementation, in which each vector register in vector register file 201 includes two elements (i.e., the primary vector register element and the secondary vector register element), multiplexers 210 and 212 enable at least four possible conditions, namely, data from bus 251 is stored in primary register file 202 and data from bus 252 is stored in secondary register file 204; bus 251 data is stored in both of the register files (replication); bus 252 data is stored in both of the register files (a second replication example); and bus 251 data is stored in secondary register file 204 while bus 252 data is stored in primary register file 202 (reordering of data).

Data reordering and replication as data is stored back to memory is implemented with a pair of output multiplexers 240 and 242, which each receive a pair of 64-bit inputs, namely, the contents of a primary side source register ($S_P$) and the contents of a secondary side source register ($S_S$). The outputs of multiplexers 240 and 242 are 64-bit busses 253 and 254 respectively. Busses 253 and 254 are merged into the 128-bit outbound data bus 250 that delivers data to the data memory on a vector register store command. The select signals for multiplexers 240 and 242 (not shown) determine whether the busses 253 and 254 carry data from primary vector register file 202 or secondary vector register file 204. Accordingly, dependent on the state of multiplexers 240 and 242, outbound data bus 250 may carry primary side data on one half of bus 250, secondary side data on the other half (in either order), primary side data on both sides of bus 250 or secondary side data on both sides of data bus 250.

Reordering and duplication of data as it is loaded into and stored back to memory from vector register 201 has the potential to improve the efficiency and performance of certain application and calculations. Moreover, data reordering and duplication, as enabled by the vector unit 200 depicted in FIG. 2 is achieved automatically depending upon the state of the multiplexer select signals. These select signals, in turn, can be controlled via bits in the opcode of a vector register load. Referring to FIG. 3, an exemplary format for an instruction 300 suitable for implementing data reordering and duplication during vector register load (and store) instructions is depicted. In the depicted embodiment, instruction 300 includes a two part opcode field 302-1 and 302-2, a target/source register field 304, an "A" operand register field 306, a "B" operand register field 308, and a "C" register operand field 310. For use with the embodiment of register file 201 as depicted in FIG. 2, the target/source register field 304 and each of the register operands field 306, 308, and 310 each comprise five bits for specifying one of the 32 registers. In this implementation, a 32-bit instruction would include 20 bits for specifying registers and 12 bits remaining for specifying opcodes and possibly other control information.

Referring to FIG. 4, an exemplary table of some of the instructions supported by vector unit 200 is presented to emphasize selected elements of the invention. With respect to the load/store reorder/duplication capabilities, for example, vector unit 200 supports a set of instructions (indicated by reference numeral 402) that includes load/store double word instructions, load/store cross instructions, and load/store replicated instructions. The load/store cross instructions, as indicated by their corresponding functional descriptions, achieves reordering of data (relative to the conventional load/store doubleword instructions) by loading/storing the first 64-bits of data bus 250 into/from secondary register file 204 (FIG. 2) while loading/storing the second 64-bits into/from primary register file 202.

Vector unit 200 as depicted in FIG. 2 includes additional elements that emphasize an additional feature, namely, the ability to perform cross-type arithmetic instructions and asymmetric instructions using a single instruction. Specifically, the depicted implementation of vector unit 200 includes a pair of 3-input arithmetic units, a primary ALU 220 and a secondary ALU 230. In an embodiment suitable for use in complex math and other intensive calculations, ALU's 220 and 230 are both double precision floating-point units each of which can receive three floating-point inputs. Moreover, each of the floating-point unit inputs can accept data from either primary side register file 202 or from secondary side register file 204. Specifically, primary ALU 220 includes an "A" input 221 connected to the output of an "A" multiplexer 222, a "C" input 223 connected to the output of a "C" multiplexer 224, and a "B" input 225 connected to the output of a "B" multiplexer 226. Similarly, secondary ALU 230 includes an "A" input 231 connected to the output of an "A" multiplexer 232, a "C" input 233 connected to the output of a "C" multiplexer 234, and a "B" input 235 connected to the output of a "B" multiplexer 236. This arrangement of multiplexers beneficially enables primary side ALU 220 and secondary ALU 230 to select inputs from either side of vector register file 201. This architecture provides the support for a variety of compound, cross-register, and asymmetric vector floating-point instructions.

Referring to FIG. 4 again, the exemplary instruction set 400 supported by vector unit 200 includes compound, parallel instructions such as the Vector Parallel Mult/Add Instruction (403) that performs a floating-point multiplication and add operation on a set of three input variables in parallel (i.e., on each side of vector register file 201) such that a result is generated and stored in primary register file 202 based on inputs retrieved from register file 202 while a second result is generated and stored in secondary register file 204 based on inputs retrieved from register file 204. Variations of this parallel compound command supported by vector unit 200 include a "negate" form of the instruction in which the result is multiplied by −1, a "subtract" form of the instruction in which the B operands are subtracted from the product of the A and C operands rather than added, and a negate subtract form in which the B operands are subtracted from the product and in which the final result is multiplied by −1.

Additional variations of the multiply add commands supported by vector unit 200 include "cross" commands in which the instruction's registers (target and source) are not all on the same "side" of vector register file 201. Representative of this class of instructions is the cross multiply and add instruction (405) in which the B, C, and T operands are on one side of vector register file 201 while the A operand is taken from the opposite side of the file. (i.e., $A_S C_P + B_P \to T_P$ and $A_P C_S + B_S \to T_S$). Variations of the cross commands include cross negate commands (result is multiplied by −1), cross-subtract commands (the B operand is subtracted from the product of the A and C operands), cross-subtract-negate (combination of the subtract and negate commands).

In addition to the basic cross-command variations, vector unit 200 includes support for a set of cross-replicate commands exemplified by the cross replicate primary command (406). In this type of command, at least one of the operands is common to the operation performed on both sides of the vector file (i.e., one operand is command to ALU 220 and ALU 230). In the exemplary instruction set of FIG. 4, the replicated operand is the A operand, but this is an implementation detail and other operand(s) could serve as the replicated operand(s). The replicated operand may come from primary register file 202 or from secondary register file 204.

A further feature of vector unit 200 and instruction set 400 includes support for asymmetric and complex vector instructions exemplified by the instruction 407 and its derivatives. In an asymmetric instruction, the mathematical operation performed by the primary side ALU 220 in response to a particular instruction is different than the mathematical operation performed by the secondary ALU 230 in response to the same instruction. Thus, as depicted in instruction 407, the primary side ALU 220 adds B operand to the product of the A and C operands while the secondary side ALU 230 subtracts the B operand from the product of the A and C operands and negates the result. The instruction 407 further incorporates a cross operand feature in which the A operand is replicated in both ALU's, but it will be appreciated that the instruction's asymmetry (difference in mathematical operations) and replication (duplication of operands) are independent elements.

The complex instructions supported by instruction set 400 and vector unit 200 include the instruction identified by reference numeral 408 and its derivatives. Complex instruction 408 is a specific combination of the cross and asymmetric instructions described above. Complex instruction 408, for example, duplicates the A operand in both ALU's, crosses the C operands, and performs a multiply/add on one side while performing a multiply/subtract and negate on the other side. The complex instructions derive their name from their particular suitability for performing complex multiplication. These instructions enable the inherently asymmetric complex operations to be performed with fewer instructions and fewer register accesses than is possible in strictly parallel SIMD machines. The result is fewer register resource contentions, more instruction slots available for other operations (e.g., loads) and higher computational throughput.

The preceding description describes the use of asymmetric instructions in the context of a vector register file 200. In other embodiments, the asymmetric instructions are implemented in the context of a scalar (non-vector) register file. In such an implementation, a single instruction would perform a first operation on a first set of operands and a second operation on a second set of operands where the first and second operations differ. The first and second sets of operands might be limited to two registers each to simplify instruction execution. An instruction of the form ASYMMULT (A, B, C) might, for example, multiply the contents of register A times the contents of register B and store the result in C and multiply the contents of register A+1 times the contents of register B+1, negate the result and store the result in register C+1.

It will be apparent to those skilled in the art having the benefit of this disclosure that the present invention contemplates a mechanism for securing a pair of mated cable connectors. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A microprocessor, comprising:
   a vector unit to execute a vector instruction, wherein the vector unit includes a vector register file having a primary vector register file and a secondary vector register file;
   a first data bus and a second data bus wherein the first and second data busses both couple the vector unit to a data memory;
   a first input multiplexer coupled to and capable of receiving inputs from both the first data bus and the second data bus and providing a single output to the primary vector register file, and a second input multiplexer, independent of the first input multiplexer, also coupled to and capable of receiving inputs from both the first data bus and the second data bus and providing a single output to the secondary vector register file;
   wherein the first data bus comprises a first portion of a data memory bus and the second data bus comprises a second, different portion of the data memory bus, and wherein the data memory bus has a width equal to at least a sum of the first portion and the second, different portion of the data memory bus; and
   wherein said first and second multiplexers enable the vector unit to replicate data on the first data bus in both the primary and secondary vector register files or replicate data on the second data bus in both the primary and secondary vector register files by each multiplexer selecting a same input from among the data on the first data bus and data on the second data bus as the output for that multiplexer.

2. The microprocessor of claim 1, wherein the processor is configured to access vector data in the data memory wherein a first vector element of the vector data travels via the first data bus and a second vector element of the vector data travels via the second data bus.

3. The microprocessor of claim 2, wherein the first vector element represents a real portion of a complex number and wherein the second vector element represents an imaginary portion of a complex number.

4. The microprocessor of claim 1, further comprising a first output multiplexer enabling data from either the primary vector register file or the secondary vector register file to be provided to the first portion of the data memory bus and a second output multiplexer, independent of the first output multiplexer, enabling data from either the primary or the secondary vector register file to be provided to the second portion of the data bus.

5. The microprocessor of claim 4, wherein the vector unit comprises a floating point vector unit wherein data is stored in the primary and secondary vector register files as 64-bit floating point data.

6. The microprocessor of claim 1, wherein the state of select signals for the first and second input multiplexers are determined by an opcode of a vector instruction being executed.

7. A vector unit within a microprocessor, the vector unit including a vector register file having a primary vector register file and a secondary vector register file, comprising:
   a first input multiplexer coupled to and capable of receiving data inputs from both a first portion of a data memory bus and a second portion of the data memory bus and providing a single output to the primary register file, and a second input multiplexer coupled to and capable of receiving data inputs from both the first portion of the data memory bus and the second portion of the data memory bus and providing a single output to the secondary register file during a vector load from the data memory; and
   a first output multiplexer that provides data from either the primary or secondary vector register file to the first portion of a data memory bus and a second output multiplexer that provides data from either the primary or secondary vector register file to the second portion of the data memory bus during a vector store to the data memory;
   wherein said first input multiplexer and said second input multiplexer enable the vector unit to replicate data on either the first portion of the memory data bus or the second portion of the memory data bus in either the primary vector register file or the secondary vector register file by each of the first input multiplexer and second input multiplexer selecting a same input from among data on the first data bus and data the second data bus as the output for that multiplexer.

8. The vector unit of claim 7, wherein the first portion of the data memory bus carries a first vector element of vector data during a vector load.

9. The vector unit of claim 8, wherein the second portion of the data memory bus carries a second vector element of vector data during a vector load.

10. The vector unit of claim 7, wherein the first output multiplexer and said second output multiplexer reorder the first and second portions of the memory data bus as the data is stored in the vector memory.

11. The vector unit of claim 7, wherein the first portion and the second portion of the memory data bus both comprise 64-bit portions of a 128-bit memory data bus and wherein each 64-bit portion is configured to carry a 64-bit floating point value.

12. A microprocessor including:
- a vector unit for executing a vector load/store instruction, wherein the vector unit includes a vector register file having a primary vector register file and a secondary vector register file, and wherein the vector unit is configured to enabled replication of vector elements of vector data as the data is retrieved from and stored to a data memory;
- a data memory bus by which vector data is carried to and from the data memory and wherein a first portion of the data memory bus carries a first vector element of the vector data and a second portion of the data memory bus carries a second vector element of the vector data, and wherein the data memory bus couples the input of the vector unit to the data memory via a first input multiplexer coupled to and capable of receiving data from both the first portion and the second portion of the data memory bus and providing a single output to the primary vector register file, and a second input multiplexer also coupled to and capable of receiving data from both the first portion and the second portion of the data memory bus and providing a single output to the secondary vector register file;
- wherein each of the first and second vector elements comprises a 64-bit floating point number, wherein the data memory bus has a width equal to a sum of the first portion and the second portion of the data memory bus; and
- wherein the vector unit is configured to interpret the opcode of the vector load/store instruction to control the replication of the vector elements utilizing the first input multiplexer and the second input multiplexer that respectively provides data selected based on the opcode from one of the first portion and the second portion of the data memory bus to a respective one of the primary register file and the secondary register file during a vector load from the data memory, wherein data is replicated when each of the first input multiplexer and the second input multiplexer selects a same input from among the first portion and the second portion of the data memory bus as the output for that multiplexer.

13. The microprocessor of claim 12, wherein the first vector element of the vector data represents a real portion of a complex number and the second vector element represents the imaginary portion of a complex number.

14. The microprocessor of claim 13, further enabled to execute an asymmetric vector instruction in which a first operation is performed on a first set of operands and a second operation is performed on a second set of operands.

* * * * *